US010487196B2

(12) United States Patent
Buisman et al.

(10) Patent No.: US 10,487,196 B2
(45) Date of Patent: Nov. 26, 2019

(54) TREAD ENHANCEMENT ADDITIVES

(71) Applicant: Kraton Chemical, LLC, Jacksonville, FL (US)

(72) Inventors: Godefridus J. H. Buisman, Savannah, GA (US); Jeffrey R Warmkessel, Savannah, GA (US); Blaisdell B Willis, Savannah, GA (US); Wolfgang Pille-Wolf, Almere (NL)

(73) Assignee: Kraton Chemical, LLC, Jacksonville, FL (US)

( * ) Notice: Subject to any disclaimer, the term of this patent is extended or adjusted under 35 U.S.C. 154(b) by 120 days.

(21) Appl. No.: 15/711,566

(22) Filed: Sep. 21, 2017

(65) Prior Publication Data

US 2018/0079895 A1    Mar. 22, 2018

Related U.S. Application Data

(60) Provisional application No. 62/397,647, filed on Sep. 21, 2016.

(51) Int. Cl.
*C08L 9/06*    (2006.01)
(52) U.S. Cl.
CPC .......... *C08L 9/06* (2013.01); *C08L 2205/025* (2013.01); *C08L 2205/035* (2013.01); *Y02T 10/862* (2013.01)
(58) Field of Classification Search
None
See application file for complete search history.

(56) References Cited

U.S. PATENT DOCUMENTS 3,235,396 A * 2/1966 Haberlin .................. B05D 7/16
427/258
3,310,196 A * 3/1967 Flaherty ............. B21D 51/2661
220/614

(Continued)

FOREIGN PATENT DOCUMENTS

CA         2642595 A1    8/2007
WO    2007/095939 A1    8/2007

(Continued)

OTHER PUBLICATIONS

Influence of oligomeric resins on traction and rolling resistance of silica tire treads, Vleugles et al., ACS Rubber Division Technical meeting, Oct. 8-10, 2013, Cleveland, Ohio, ISSN: 1547-1977 (Year: 2013).*

*Primary Examiner* — Peter A Salamon
(74) *Attorney, Agent, or Firm* — Ramesh Krishnamurti

(57) ABSTRACT

Provided herein are novel tire tread compositions. The tire tread compositions include a rubber, a terpene-based resin and at least one filler. The terpene-based resin comprises one terpene-based monomer such as α-pinene, referred to as a hompolymer, or combinations of several terpene-based monomers selected from α-pinene, β-pinene, δ-3 carene, β-phellandrene and pyrolysates of α-pinene, β-pinene, δ-3 carene, δ-2 carene, turpentine, and combinations thereof. The terpene-based resin is generally substantially free of limonene. The terpene-based resin has a softening point of about 80° C. to about 130° C., a number average molecular weight ($M_n$) ranging from about 500 g/mol to about 775 g/mol and a glass transition temperature ($T_g$) of from about 38° C. to about 81° C. The tire tread composition having the terpene-based resin shows improvements of tan δ at 0°, wet (Continued)

grip and rolling resistance as compared with the compositions without the terpene-based resin or comprising alpha methyl styrene resin.

12 Claims, 1 Drawing Sheet

(56) References Cited

U.S. PATENT DOCUMENTS

| | | | | |
|---|---|---|---|---|
| 4,427,832 | A | * | 1/1984 | Yagi ..................... C08F 212/10 525/238 |
| 6,348,539 | B1 | * | 2/2002 | Wideman .............. B60C 1/0016 152/450 |
| 7,342,070 | B2 | * | 3/2008 | Tsukimawashi .......... B60C 1/00 525/105 |
| 7,629,408 | B2 | | 12/2009 | Cambon et al. |
| 8,318,861 | B2 | | 11/2012 | Houjo et al. |
| 8,637,606 | B2 | | 1/2014 | Pille-Wolf et al. |
| 8,871,832 | B2 | * | 10/2014 | Takizawa .............. B60C 1/0016 523/156 |
| 8,921,464 | B2 | | 12/2014 | Liu et al. |
| 2004/0092644 | A1 | | 5/2004 | Labauze |
| 2004/0254301 | A1 | * | 12/2004 | Tsukimawashi .......... B60C 1/00 525/271 |
| 2007/0161735 | A1 | | 7/2007 | Bergman |
| 2010/0104689 | A1 | | 4/2010 | Thorengaard |
| 2010/0317800 | A1 | | 12/2010 | Pille-Wolf et al. |
| 2011/0213049 | A1 | * | 9/2011 | Takizawa .............. B60C 1/0016 523/156 |
| 2011/0301261 | A1 | * | 12/2011 | Thiele .................... B60C 1/0016 523/155 |
| 2013/0153100 | A1 | | 6/2013 | Piffard et al. |
| 2014/0251519 | A1 | | 9/2014 | Piffard et al. |
| 2017/0190888 | A1 | * | 7/2017 | Pille-Wolf .......... B29D 30/0601 |
| 2017/0232795 | A1 | * | 8/2017 | Isitman ................. B60C 1/0016 524/508 |
| 2019/0062529 | A1 | * | 2/2019 | Isitman ..................... C08L 7/00 |
| 2019/0062537 | A1 | * | 2/2019 | Mejia .................... C08F 212/08 |

FOREIGN PATENT DOCUMENTS

| | | |
|---|---|---|
| WO | 2009/007767 A1 | 1/2009 |
| WO | 2015153055 A2 | 10/2015 |
| WO | 2017/079668 A1 | 5/2017 |

* cited by examiner

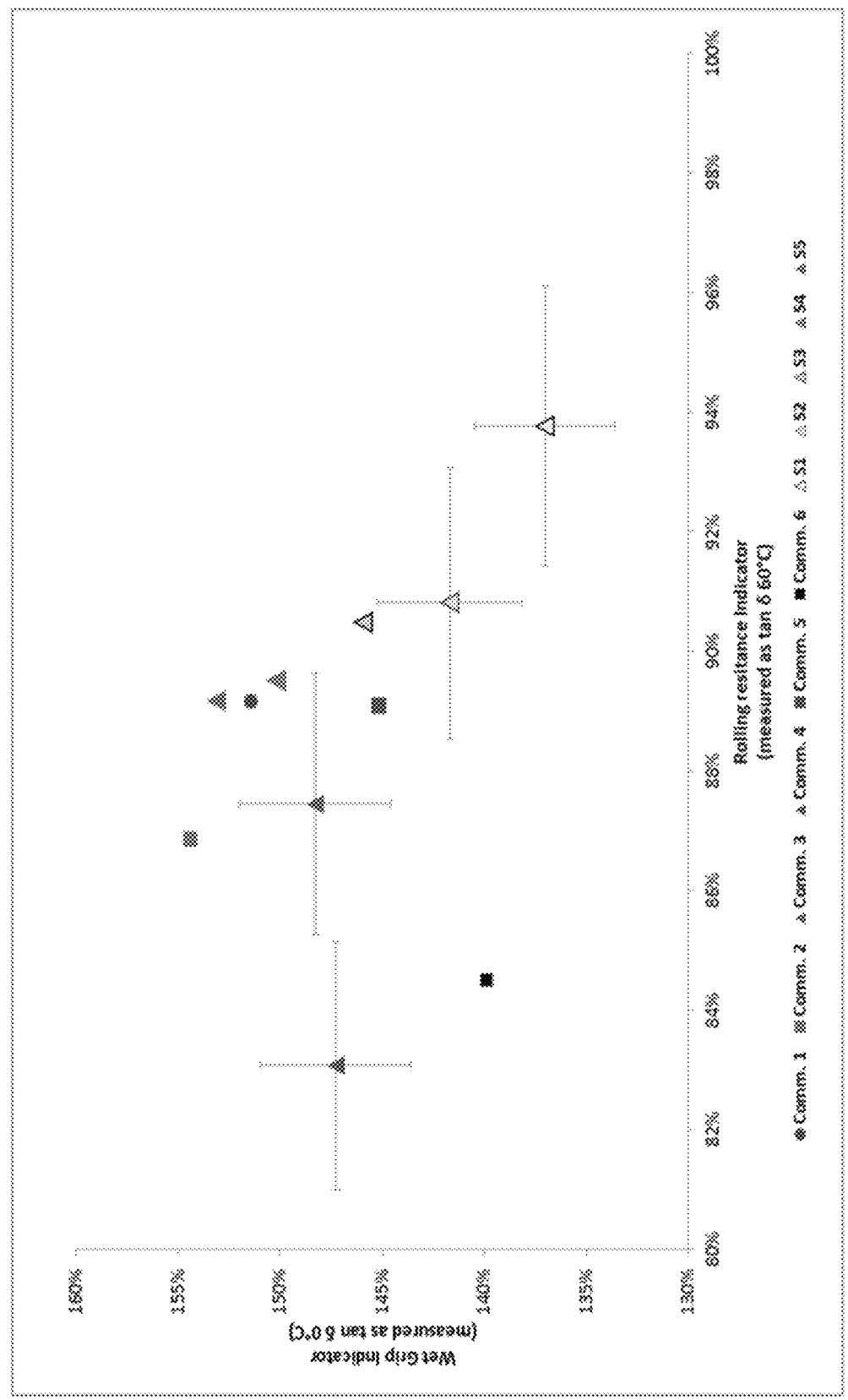

TREAD ENHANCEMENT ADDITIVES

CROSS REFERENCE TO RELATED APPLICATIONS

This application claims priority to U.S. Provisional Application No. 62/397,647 filed Sep. 21, 2016, the entirety of which is incorporated herein by reference.

TECHNICAL FIELD

The present disclosure is in the field of chemistry. More specifically, the present disclosure relates to compositions comprising high softening point resins suitable for use in tire applications, more specifically tire tread compositions.

BACKGROUND

Tires, as a vehicle's sole link with the roadway, play a key role in automotive safety and also have an indirect influence on fuel consumption, as well as many other characteristics. Rubber tires, such as those used in transportation, are conventionally prepared with a rubber tread. Such rubber tread is often composed of a specified rubber composition. Some desired attributes of high performance tires include a low rolling resistance (e.g., the force resisting the motion when a tire rolls on the surface), high-wear resistance, and a high level of grip on slick surfaces such as wet or damp roads.

U.S. Pat. No. 8,318,861 discloses a rubber composition capable of using in a tread rubber of a tire to improve both an initial gripping performance and a running stability of the tire as compared with those of conventional tires.

U.S. Patent Publication No. 2004/0092644 discloses a cross-linkable or cross-linked rubber composition which is usable to constitute a tread of a tire, to such a tread having in particular improved wear resistance, and to a tire having improved endurance by incorporating this tread.

U.S. Pat. No. 7,629,408 discloses a tire tread comprising a rubber composition based on at least a diene elastomer, a reinforcing inorganic filler such as silica, an inorganic filler/elastomer coupling agent and carbon black in a very small quantity having a significantly improved grip on wet roads.

U.S. Patent Publication No. 2013/0153100 discloses a tire tread having a configuration and material properties that improve wet traction. This results in better wet traction and a shorter stopping distance during the braking event.

U.S. Patent Publication No. 2014/0251519 discloses tire treads having one or more repeating pitches. The tread blocks are also formed from a rubber composition based upon a diene elastomer, a plasticizing system and a cross-linking system.

There exists an ongoing need for improved compositions for the preparation of tire components able to provide a desirable balance between low rolling resistance and good-wet traction.

SUMMARY

Provided herein is a novel composition for use in tires. The subject composition includes a rubber and a terpene-based resin. The terpene-based resin component may be a homopolymer or a mixture of terpene-based monomers. The resin component may have a softening point ranging from about 80° C. to about 130° C.; a number average molecular weight ($M_n$) ranging from about 500 g/mol to about 775 g/mol; and a glass transition temperature ($T_g$) of from about 38° C. to about 81° C. The presence of the terpene-based resin in the tire tread composition leads to improvement in the tire tread performance such as rolling resistance and wet grip. The rolling resistance improvement is of at least 4% when compared with a composition having an alpha methyl styrene resin; tan δ at 0° is increased from about 135% to about 153% when compared to a composition without resin; and the wet grip/rolling resistance ration (WG*RR) shows at least (or from about) 7.5% improvement when compared with a composition with alpha methyl styrene resin.

BRIEF DESCRIPTION OF THE DRAWINGS

FIG. 1 is a graph of the wet traction indicator (tan @ 0° C.) and rolling resistance indicator (tan @ 60° C.) for the indicated samples.

DETAILED DESCRIPTION

Disclosed herein are novel resin compositions and methods of making and using the same. In an aspect, the resin is a terpene-based resin, wherein the resin is a mixture of terpene monomers referred to herein as a heteropolymer, alternatively a terpene homopolymer where the terpene homopolymer may be an α-pinene homopolymer. Herein, a terpene homopolymer of the terpene-based resin may contain some inconsequential amount of an additional monomer and still be considered a homopolymer. For example, an inconsequential amount of another monomer may be present and that additional monomer may polymerize under the conditions disclosed herein. In an aspect, the terpene-based resin is substantially free of limonene wherein the amount of limonene is less than 10 wt. %, preferably less than 5 wt. % and more preferably less than 2 wt. % and most preferably less than 1 wt. % based upon the total amount of the terpene-based resin. In an aspect, the compositions of the present disclosure comprise a terpene resin characterized by an elevated softening point as will be described in more detail later herein.

Terpenes herein refer to molecules which are derived from units of isoprene. The basic molecular formula of terpenes are multiples of $(C_5H_8)_n$ where n is the number of linked isoprene units with a minimum of n equal to 2. Examples of terpenes suitable for use in the terpene-based resin include without limitation α-pinene, β-pinene, δ-3 carene, β-phellandrene and pyrolysates of α-pinene, β-pinene, δ-3 carene, δ-2 carene, turpentine, and combinations thereof. In an aspect, the terpene is α-pinene. Alternatively, the terpene is a mixture of α-pinene and β-pinene monomers. In an aspect, the terpene-based resin disclosed herein may include resins of different monomers, the monomers may be selected from a group, but not limited to, isoprene, limonene, terpene, alpha-pinene, beta-pinene, and combinations thereof. Terpene monomers useful in the present disclosure may be obtained from a variety of sources including but not limited to a crude sulfate turpentine (CST) feedstock. In one aspect, the terpene-based resin may be obtained from a monomer feed rich in α-pinene and includes additional monomers, including but not limited to β-pinene, camphene, myrcene and dipentene. In one aspect, the monomer feed rich in α-pinene may include α-pinene in amount of at least 90 wt. %, alternatively of from 92 wt. % to 94 wt. %, with additional terpene monomers. Alternatively, the terpene-based resin may be obtained from a monomer feed rich in β-pinene monomer and may include additional monomers, including but not limited to α-pinene, camphene, myrcene and phellandrene. The terpene-based resin may also be obtained from a mixture of the monomer feed rich in α-pinene and the monomer feed rich in β-pinene.

The terpene-based resin may include α-pinene in an amount of at least 70 wt. %, at least 80 wt. %, at least 90 wt. %, at least 94 wt. %, at least 96 wt. %, or 100 wt. % based upon the total amount of the terpene-based resin. Alternatively, α-pinene may be present in amount of 70 wt. % to 100 wt. %, 80 wt. % to 100 wt. %, 90 wt. % to 100 wt. %, 94 wt. % to 100 wt. % or 96 wt. % to 100 wt. % based upon the total weight of the terpene-based resin. In an aspect, the terpene-based resin may include β-terpene in an amount of 30 wt. % or less, alternatively 20 wt. % or less, 15 wt. % or less, 10 wt. % or less, 6 wt. % or less, or 4 wt. % or less based upon the total amount of the terpene-based resin. Alternatively, the terpene-based resin may include β-pinene in an amount ranging from 0 wt. % to 30 wt. %, 0 wt. % to 20 wt. %, 0 wt. % to 10 wt. %, or 4 wt. % to 6 wt. % based upon the total weight of the terpene-based resin. Alternatively, the terpene-based resin may include a ration of α-pinene monomer to β-pinene monomer ranging from 100:0, 70:30 to 96:4, alternatively from 80:20 to 96:4, 90:10 to 96:4 or 94:6 to 96:4.

The terpene-based resin suitable for use in the present disclosure may be prepared by any suitable methodology. In an aspect, the terpene-based resin may be synthesized via cationic polymerization of a suitable terpene monomer, or a mixture of suitable terpene monomers utilizing a Lewis acid catalyst.

Examples of Lewis acid catalysts suitable for use in the preparation of a terpene-based resin include without limitation metal halides such as $BF_3$, $BBr_3$, $AlF_3$, $AlBr_3$, $TiCl_4$, $TiBr_4$, $TiI_4$, $FeCl_3$, $FeCl_2$, $SnCl_4$, $WCl_6$, $MoCl_5$, $ZrCl_4$, $SbCl_3$, $SbCl_5$, $TeCl_2$ and $ZnCl_2$; metal alkyl compounds such as $Et_3Al$, $Et_2AlCl$, $Et_2AlCl_2$, $Et_3Al_2Cl_3$, $(iBu)_3Al$, $(i-Bu)_2AlCl$, $(iBu)AlCl_2$, $Me_4Sn$, $Et_4Sn$, $Bu_4Sn$ and $Bu_3SnCl$ and metal alkoxy compounds such as $Al(OR)_{3-x}Cl_x$ and $Ti(OR)_{4-y}Cl_y$ (in which R represents an alkyl group or an aryl group, x represents an integer of 1 or 2 and y represents an integer of 1 to 3). Other examples include (i) combinations of $AlCl_3$ and alkyl tertiary amines, such as trimethylamine; (ii) combinations of $AlCl_3$ and organosilicon compounds like trialkyl silicon halides, lower dialkyl phenyl silicon halides, and hexa alkyl disiloxanes; (iii) combinations of $AlCl_3$ and organo germanium halides, such as trimethyl germanium chloride and triethyl germanium ethoxide; and (iv) lower alkyl groups of 1 to 18 carbon atoms in the alkyl group suffice. In particular, $AlCl_3$, $Et_2AlCl$, $EtAlCl_2$, $Et_3Al_2Cl_3$, $BCl_3$, $SnCl_4$, $Me_3SiCl$, $TiCl_4$ and $Ti(OR)_{4-y}Cl_y$ may be advantageously used in terms of high reactivity and good selectivity. In an aspect, the catalyst comprises $AlCl_3$, $AlBr_3$, $Me_3SiCl$ or combinations thereof. In another aspect, the overall catalyst system additionally comprises an aluminum halide such as $AlCl_3$ in combination with the Lewis acid catalyst (e.g., $AlBr_3$ or $Me_3SiCl$).

Solvents in which a cationic polymerization of the type disclosed herein may be conducted by the solution polymerization process are not particularly limited, as long as it is a solvent in which a terpene-based monomer such as α-pinene and/or a mixture of terpene-based monomers such as α-pinene and β-pinene are soluble and in which little chain termination occurs. From the viewpoint of solubility, reactivity and reaction yield, the solvent can be halogenated hydrocarbons, aromatic hydrocarbons, aliphatic hydrocarbons and the like. In some aspect the solvent utilized in a polymerization process of the type disclosed herein comprises a single solvent or alternatively a mixture in which two or more solvents are blended together. Specific examples include without limitation halogenated hydrocarbon-based solvents such as methylene chloride, chloroform, 1,1-dichloromethane, 1,2-dichloroethane, n-propyl chloride, 1-chloro-n-butane and 2-chloro-n-butane; aromatic hydrocarbon-based solvents such as benzene, toluene, xylene, anisole and naphtha; and aliphatic hydrocarbon-based solvents such as pentane, hexane, heptane, octane, cyclopentane, cyclohexane, methylcyclohexane, ethylcyclohexane, and the like.

In an aspect, the polymerization reactions may be carried out in the temperature range of from about −120° C. to about 100° C., alternatively from about −80° C. to about 80° C., or alternatively from about 5° C. to about 50° C.

In an aspect, the terpene-based resin suitable for use in the present disclosure has a softening point of from about 60° C. to about 150° C. alternatively of from about 70° C. to about 140° C., or alternatively of from about 80° C. to about 130° C. as determined in accordance with ASTM D6090 (publication date 1997). The softening point herein refers to the temperature at which the sample, suspended in a cylindrical cup with a 6.35 mm hole in the bottom and with a stainless steel ball, 8 mm in diameter, centered on top of the sample in the cup, flows downward a distance of 19 mm to interrupt a light beam, as the sample is heated at a linear rate in air. The softening point temperature may be determined with a Cup and Ball using FP83HT of Mettler-Toledo.

In an aspect, the terpene-based resin suitable for use in the present disclosure has a weight average molecular weight ($M_w$) ranging from about 800 g/mol to about 1100 g/mol. $M_w$ describes the molecular weight average distribution of a resin (e.g., terpene-based resin) and is calculated according to Equation 1:

$$M_w = \frac{\Sigma_i N_i M_i^2}{\Sigma_i N_i M_i} \tag{1}$$

where $N_i$ is the number of molecules of molecular weight $M_i$. The method to calculate the weight average molecular weight ($M_w$), is determined using gel permeation/size exclusion chromatography (GPC-SEC) as described in ASTM D5296 (publication date 2005).

In an aspect, the terpene-based resin suitable for use in the present disclosure has a number average molecular weight ($M_n$) ranging from about 500 g/mol to about 775 g/mol. $M_n$ is the number average of the molecular weights of the individual resins and may be calculated according to Equation 2:

$$M_n = \frac{\Sigma_i N_i M_i}{\Sigma_i N_i} \tag{2}$$

where $N_i$ is the number of molecules of molecular weight $M_i$. The method to calculate the number average molecular weight ($M_n$), is determined using gel permeation/size exclusion chromatography (GPC-SEC) as described in ASTM D5296 (publication date 2005).

In an aspect, the terpene-based resin suitable for use in the present disclosure has a third moment or third power average molecular weight ($M_z$) ranging from about 1300 g/mol to about 1600 g/mol. $M_z$ is a higher order molecular weight average which is calculated according to Equation 3:

$$M_z = \frac{\Sigma_i N_i M_i^3}{\Sigma_i N_i M_i^2} \quad (3)$$

where $N_i$ is the amount of substance of species i and $M_i$ is the molecular weight of species i. The method to calculate the third power molecular weight ($M_z$), is determined using gel permeation/size exclusion chromatography (GPC-SEC) as described in ASTM D5296 (publication date 2005).

In an aspect, the terpene-based resin suitable for use in the present disclosure is characterized by a polydispersity index (PDI) of from about 1.30 to about 1.70. As will be understood by the ordinarily skilled artisan having industry experience is that resins having a lower PDI result in tread compositions having an improved rolling resistance. The PDI is given by equation 4:

$$PDI = M_w/M_n \quad (4)$$

In an aspect, the terpene-based resin suitable for use in the present disclosure has glass transition temperature ($T_g$) of from about 38° C. to about 81° C. Generally, Tg (glass-liquid transition or glass transition) is the reversible transition in amorphous materials from a hard and relatively brittle "glassy" state into a molten state as the temperature is increased. The Tg may be determined according to ASTM D 6604 (publication date 2013) using a Differential Scanning calorimeter SC Q2000 of TA Instruments.

In an aspect, compositions of the present disclosure comprise (i) the terpene-based resin of the type disclosed herein and (ii) a rubber. A rubber suitable for use in the present disclosure may comprise natural rubber and its various raw, reclaimed, or modified forms; various synthetic rubber polymers; and any combinations thereof, depending upon the desired end use. Representative synthetic rubber polymers are the homopolymerization products of butadiene and its homologues and derivatives, for example, methylbutadiene, dimethylbutadiene and pentadiene, as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and ethylene/propylene/dicyclopentadiene terpolymers.

Additional examples of rubbers which may be used, include without limitation alkoxy-silyl end functionalized solution polymerized polymers (SBR, PBR, IBR and SIBR), silicon-coupled and tin-coupled star-branched polymers. It should be understood that any of the rubbers may be end-modified. Such an end-modifying group may be a carboxyl group, an amino group, a hydroxyl group, an alkoxyl group or a silanol group (—SiOH), for example. Meanwhile, a rubber may contain a modifying group inside the rubber chain. Such a modifying group may be an epoxy group or a ketone group, for example. Any of these rubbers can be used either in a single form or a blended form.

In an aspect, the rubber is chosen from the group consisting of styrene butadiene rubber, polybutadiene rubber, natural rubber, halogenated butyl rubber, butyl rubber, polyisoprene rubber, in chain solution-polymerized polymers, and styrene/isoprene/butadiene terpolymer rubbers.

Examples of a styrene butadiene rubber suitable for use in the present disclosure are those copolymers containing any amount of styrene. For example the styrene butadiene rubber may contain greater or less than about 50% by weight of styrene. When the composition contains a styrene butadiene copolymer, the styrene butadiene rubber may contain 5, 10, 15, 20, 25, 30, 35, 40, 45, 50, 55, 60, 65, 70, 75, 80, 85, 90, and 95% by weight of styrene, including any and all ranges and subranges therein. Examples of polybutadiene rubbers suitable for use in the present disclosure include without limitation those having a 1,4 configuration, or 1,2 configuration. Examples of polyisoprene rubber suitable for use in the present disclosure include without limitation those having 1,4 configuration, cis-1,4 configuration, and/or 3,4 configuration.

In an aspect, the rubber comprises a styrene butadiene copolymer wherein the double bonds of the rubber polymer or copolymer may be at least partially hydrogenated. The styrene butadiene copolymer may contain double bonds that are more or less than 50% hydrogenated, for example, in the butadiene portion of the copolymer. Alternatively, the rubber polymer or copolymer may be about 0, 5, 10, 15, 20, 25, 30, 35, 40, 45, 50, 55, 60, 65, 70, 75, 80, 85, 90, 95 and 100% hydrogenated, including any and all ranges and subranges therein.

The compositions of the present disclosure may also contain pigments and fillers, such as reinforcing fillers. Non-limiting examples of such pigments and fillers include inorganic and organic fillers such as silicon-containing compounds, aluminum-containing compounds, carbon black, carbon nanotubes, clay, and combinations thereof. Non-limiting examples of silicon-containing compounds include silaceous compounds, such as silaceous pigments, pyrogenic silaceous compounds (silica), precipitated silica, wet silica (hydrated silicic acid), dry silica (anhydrous silicic acid), calcium silicate, aluminum silicate, and combinations thereof. In an aspect, the composition comprises precipitated silica, alternatively a highly dispersible precipitated silica. In an aspect, a silica suitable for use in the present disclosure has a high surface area. For example, the silica surface area may range from about 100 m$^2$/g to about 1000 m$^2$/g.

Non-limiting examples of aluminum-containing compounds suitable for use as fillers in the present disclosure include fumed and/or precipitated alumina represented by the following general formula: $Al_2O_3.nH_2O$; where n represents a number ranging from about 0 to about 3.

In an aspect, the filler comprises carbon black. Herein carbon black refers to a fine particulate aggregate of carbon possessing an amorphous quasi-graphitic molecular structure obtained primarily by burning hydrocarbons in insufficient air. In an aspect, a carbon black suitable for use in the present disclosure is characterized by an iodine adsorption [IA] of 60 mg/g or greater and a dibutyl phthalate absorption (DBP) number of 80 ml/100 g or greater. The iodine absorption is related to the surface area of the carbon black and may be determined in accordance with ASTM D1510 while the DBP absorption number is related to the material's structure and may be determined in accordance with ASTM D2414, publication date 2016.

The compositions may contain the fillers disclosed herein singularly or in combination to provide some user and/or process-desired amount. In an aspect, the filler(s) is present in the composition in an amount of from about 5 parts per hundred rubber (phr) to about 250 phr, alternatively from about 10 phr to about 150 phr, alternatively from about 40 phr to about 120 phr, or alternatively from about 60 phr to about 120 phr. The composition may contain 5, 10, 15, 20, 25, 30, 35, 40, 45, 50, 60, 70, 80, 90, 100, 110, 120, 130, 140, 150, 160, 170, 180, 190, 200, 210, 220, 230, 240 and 250 phr filler including any and all ranges and subranges therein.

The compositions of the present disclosure may further comprise a coupler or coupling agent. Herein the coupling agent may function to remedy an insufficient degree of physical and/or chemical bonding between the filler and the rubber polymer or copolymer so as to enable the filler to reinforce the rubber polymer and/or copolymer. In an aspect, the coupling agent is any compound capable of enhancing the degree of physical and/or chemical bonding between the filler and the rubber polymer or copolymer.

For example, when silica is used as a filler, the coupling agents may generally be composed of a silane which has a constituent component, or moiety, (the silane portion) capable of reacting with the silica surface and, also, a constituent component, or moiety, capable of interacting with the rubber, particularly a sulfur-vulcanizable rubber which contains carbon-to-carbon double bonds, or unsaturation. In this manner, then the coupling agent may act as a connecting bridge between the silica and the rubber and thereby enhances the rubber reinforcement aspect of the silica.

Nonlimiting examples of other coupling agents suitable for use in the present disclosure include silane coupling agents containing a polysulfide component, or structure such as, for example, bis-(trialkoxysilyalkyl) organosilane polysulfides containing from 2 to about 8 sulfur atoms in a polysulfide bridge such as, for example, bis-(3-triethoxysilylpropyl)tetrasulfide, trisulfide or disulfide.

The compositions may further comprise a vulcanization agent. A vulcanization agent suitable for use in the present disclosure is sulfur or a sulfur-donor compound which may be used in the presence of a kinetic modifier of the reaction such as vulcanization accelerators and antioxidants. Nonlimiting examples of sulfur-donor compounds suitable for use in the present disclosure are 2-(4-morpholinyldithio)-benzothiazole, tetramethylthiuram disulfide, tetraethylthiuram disulfide, dipentamethylene thiuram hexasulfide, N,N'-caprolactam disulfide and the like.

Examples of the vulcanization accelerators suitable for use in the present disclosure include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine, and orthotolylbiguanidine. The compositions may further comprise antioxidants and antidegradants such as diphenyl-p-phenylenediamine, fatty acids such as stearic acid, and inorganic oxides such as zinc oxide.

The compositions may further comprise an extender oil. Such extender oils may serve a variety of functions such as (i) reduction of the Mooney viscosity of synthetic rubber to ease their compounding with other ingredients of rubber mixtures (ii) as a plasticizer to reduce the Mooney viscosity to ease extrusion of the compounds and iii) to modify the mechanical properties of the rubber compound after vulcanization. In an aspect the extender oil is a mineral-based oil such as Treated Distilled aromatic extract (TDAE), Mild Extract Solvate (MES), Residual Aromatic Extract (RAE), Treated Aromatic Extract (TAE), naphthenic oil, black naphthenic oil, and vegetable oils such as sunflower oil, carnauba oil, linseed oil, rape seed oil, derivatives of vegetable fatty acid or tall oil fatty acids.

In an aspect, a composition of the type disclosed herein comprises a terpene-based resin, a rubber compound; and one or more of the following: a filler, a coupling agent, an extender oil, a vulcanization agent, a vulcanization accelerator, and an antioxidant; all of the type disclosed herein. In such aspects, the terpene-based resin may be present in the composition in an amount in the range of from about 1 to about 50 phr.

In an aspect, the present disclosure contemplates the terpene-based resin as a component of an adhesive composition such as hot-melt adhesive. In such aspects, the adhesive composition may comprise an additional polymer. The additional polymer in the adhesive composition can be any suitable polymer. The polymer can be, for example, a polyacrylate, a polyolefin, a polyamide, a polyvinyl ether, a polyurethane, a polyester, a polyvinyl ester, a copolymer thereof, or a blend thereof. In some cases, the polymer can be derived from one or more ethylenically-unsaturated monomers (e.g., one or more ethylenically-unsaturated monomers are chosen from styrene, ethylene, butadiene, isoprene, (meth)acrylate monomers, vinyl acetate, vinyl ester monomers, and combinations thereof). In some aspects, the polymer can comprise a copolymer of ethylene and n-butyl acrylate. In some aspects, the polymer can comprise a copolymer of styrene and one or more of isoprene and butadiene. In some aspects, the polymer can comprise a block copolymer of styrene and one or more of isoprene and butadiene. In some aspects, the polymer can comprise a hydrogenated block copolymer of styrene and one or more of isoprene and butadiene wherein one or more of isoprene and butadiene are hydrogenated or partly hydrogenated. In certain aspects, the polymer derived from one or more ethylenically-unsaturated monomers comprises a polymer derived from vinyl acetate. Polymers derived from vinyl acetate include polymers derived, at least in part, from polymerization of vinyl acetate monomers. For example, the polymer derived from vinyl acetate can be a homopolymer of vinyl acetate (i.e., polyvinyl acetate; PVA). The polymer derived from vinyl acetate can also be a copolymer of vinyl acetate and one or more additional ethylenically-unsaturated monomers (e.g., poly(ethylene-co-vinyl acetate), EVA).

The hot-melt adhesive can include one or more additional components, including additional tackifiers, waxes, stabilizers (e.g., antioxidants), templating agents, pigments and dyestuffs, plasticizers, and fillers. Hot-melt adhesive compositions in general contain one or more waxes such as a Fischer-Tropsch wax or a paraffin wax. U.S. Pat. No. 8,921,464 B2 to Liu describes wax components that can be applied in hot-melt adhesives. Such waxes include petroleum based waxes, synthetic waxes and naturally occurring waxes such as plant and animal waxes. Waxes include, but are not limited to, paraffin-based waxes, microcrystalline waxes, high density low molecular weight waxes, less refined waxes, highly refined waxes which elicit a sharp melting point, and synthetic Fischer-Tropsch waxes including low melting Fischer-Tropsch waxes and oxidized Fischer-Tropsch waxes. Templating agents are described in U.S. Pat. No. 8,921,464 B2 to Liu et al which is incorporated herein by reference in their entirety.

Hot-melt adhesives include low temperature application hot-melt adhesives which commonly comprise a mixture of ethylene copolymers, such as ethylene n-butyl acrylate (EnBA) copolymers having a high melt flow (MI) index value such as having MI values of e.g. 750 grams/10 minutes or higher. Low temperature application hot-melt adhesives include blends comprising an EnBA copolymer such as a blend with an poly(ethylene-co-vinyl acetate) (EVA) copolymer, that can lead to hot-melt adhesives which can be applied at temperatures of from about 100° C. to about 150° C. Such low temperature application hot-melt adhesives can contain other co-polymers such as ethylene ethylhexyl acrylate, an ethylene-ethyl acrylate, an ethylene-methyl acrylate, and combinations thereof having good bond strength with exceptional toughness, good heat resistance and acceptable application viscosity.

In some aspects, the polymeric composition can be a dispersion (e.g., an aqueous dispersion). In some aspects, the polymeric composition can be an adhesive dispersion. In certain aspects, the dispersion can comprise from 20% by weight to 50% by weight polyacrylate polymer or copolymer; and from 5% by weight to 50% by weight of the oligoester composition. The dispersion can have a solids content of from 35% to 80%. The dispersion can comprise particles having a median particle size of from 5 nm to 5000 nm (e.g., from 5 nm to 1500 nm, or from 5 nm to 500 nm), as determined by scanning electron microscopy.

In some aspects, the polymeric composition can be used in a chewing gum, a dental-film forming composition, a controlled-release mucoadhesive system, or an encapsulated food or medical release system, e.g., a medical formulation, due to its softening point, allowing controlled degrees of finished firmness and compatibility when use as a base. The polymeric composition can be of one type, e.g., alpha-pinene, or combinations of more than one type, e.g., alpha-pinene and beta-pinene. In one embodiment, the polymeric composition is used in an amount ranging from 5 to 100 wt. % of a compressible chewing gum. Embodiments of the polymeric composition for use in controlled-release mucoadhesive systems, e.g., chewing gums, dental films, etc., are disclosed in US Patent Publication Nos. 2010/0104689A1, US2014/0056949A1, WO2017079668A1, CA2642595C, US20100104689A1, WO2007095939A1, and WO2009007767A1, incorporated herein by reference in their entirety.

In some aspects, the polymeric composition can be a tire tread composition comprising a rubber polymer (e.g., a copolymer derived from styrene and one or more of isoprene and butadiene), a filler, and the terpene-based resin described herein. The terpene-based resin may be present in the tire tread composition in an amount of from 1 to 80 parts by weight (e.g., from 2 to 75 parts by weight, from 5 to 70 parts by weight, from 35 to 75 parts by weight, or from 55 to 75 parts by weight), based on 100 parts by weight of the rubber polymer. In some aspects, the terpene-based resin may have a glass transition temperature of from 30° C. to 100° C.

In an aspect, compositions of the type disclosed herein (e.g., the terpene-based resin, rubber, etc.) may be prepared by contacting the components in the order listed and mixing the materials using a suitable mixer. The mixing operation is typically a batch operation, with each batch producing the rubber compound in less than three to five minutes. The mixer is a sophisticated piece of heavy equipment with a mixing chamber that has rotors inside. Its main function is to break down the rubber bale, fillers, and chemicals and mix them with other ingredients. The curative package is normally added in the final stage of mixing. Once the mixing is completed, the batch is dumped out of the mixer and sent through a series of machines to form it into a continuous sheet called a "slap." An exemplary mixing protocol is provided in the examples.

In an aspect, tire components fabricated from a composition of the type disclosed herein (designated a tread enhanced composition (TEC)) display a wet traction indicator (also known as wet grip) that is increased by as much as 9% when compared to an otherwise similar composition comprising a reference resin. Wet traction and rolling resistance indicators can be determined as described in the examples section utilizing dynamic mechanical analysis.

In an aspect, the TECs disclosed herein have a tan $\delta$ at 0° that is increased by from about 135% to about 153%, when compared to a TEC containing only oil. Tan $\delta$ at 0° C. is an indicator of wet traction.

In an aspect, the TECs disclosed herein have a rolling resistance indicator (tan $\delta$ at 60° C.) that is greater than about 4%, alternatively greater than about 7% or alternatively greater than about 9% when compared to a TEC with the reference resin commercial sample 6. Tan $\delta$ at 60° C. is an indicator of rolling resistance, the lower the Tan $\delta$ at 60° C., the better is the rolling resistance.

In an aspect, the TEC disclosed herein has a wet grip indicator and rolling resistance optimized by a minimum of from about 7.5% to about 15% for the softening point range considered when compared with a TEC containing AMS, or reference resin commercial sample 6.

EXAMPLES

The subject matter of the present disclosure having been generally described, the following examples are given as particular aspects of the disclosure and to demonstrate the practice and advantages thereof. It is understood that the examples are given by way of illustration and are not intended to limit the specification or the claims to follow in any manner.

Example 1—Sample 1

Preparation of terpene-based resin having a 85° C. softening point.

To a nitrogen-blanketed, 1 L Morton (baffled) round bottom flask (RBF) was added 250 grams of reagent grade xylene (dried by 4 Å sieves). To the xylene, 15 grams of a catalyst solution containing aluminum chloride ($AlCl_3$) and 10 grams aluminum bromide ($AlBr_3$) was added to minimize air/moisture exposure. $AlCl_3$ and $AlBr_3$ acted as catalysts on terpene-based monomers to deliver the targeted product. Next the catalyst solution was cooled between 10-30° C. using an external ice water bath. While rapidly stirring the heterogeneous catalyst solution with a mechanical agitator under a nitrogen blanket, 250 grams of monomer feed rich in α-pinene, was added slowly. Upon completion of the monomer feed addition, the solution was stirred between 20-50° C. under nitrogen to complete the reaction. Next, the heating mantle was removed and the solution cooled to room temperature. Hereafter, 100 grams of water were added to the RBF and stirring continued for 10 minutes at room temperature. The stirring was then stopped, the aqueous and organic layers were allowed to separate and the aqueous layer was removed. An additional water wash was performed. The organic layer was then transferred to another 1 L RBF. Solvent and light oils were removed by standard distillation practices. A resin was produced having a softening point of 85.6° C. with a neat resin color of 2.1 Gardner. The resin yield was 73.6%.

Example 2—Sample 2

Preparation of terpene-based resin having a 100° C. softening point resin.

To a nitrogen-blanketed, 1 L Morton (baffled) round bottom flask (RBF) was added 200 grams of reagent grade xylene (dried by 4 Å sieves). To the xylene, 10 grams of aluminum chloride ($AlCl_3$) and 2 grams of trimethylchlorosilane (TMSCl) were added in a fashion to minimize air/moisture exposure. $AlCl_3$ and TMSCl act as catalysts to deliver the targeted product. Next the catalyst solution was cooled between 10-30° C. using an external ice water bath. While rapidly stirring the heterogeneous catalyst solution with a mechanical agitator under a nitrogen blanket, 200 grams of monomer feed rich in α-pinene (dried" by 4 Å sieves) was added slowly. Upon completion of the feedstock addition, the solution was stirred between 20-50° C. under nitrogen for 2 hours. Next, the ice water bath was removed and the solution warmed to room temperature (approximately 22° C.). Upon reaching room temperature, 100 grams of water were added to the RBF and stirring continued for 10 minutes at room temperature. The stirring was then stopped, the aqueous and organic layers were allowed to separate and the aqueous layer was removed. An additional water wash was performed. The organic layer was then transferred to another 1 L RBF where the solvent and light oils were removed using standard distillation practices. A resin was produced having a softening point of 101.5° C. with a neat resin color of 3.1 Gardner. The resin yield was 77.3%.

Example 3—Sample 3

Preparation of terpene-based resin having a 105° C. softening point. To a nitrogen-blanketed, 5 L Morton (baffled) round bottom flask (RBF) was added 800 grams of reagent grade xylene (dried by 4 Å sieves). To the xylene, 50 grams of aluminum chloride ($AlCl_3$) 10.4 grams of and trimethylchlorosilane (TMSCl) were added in a fashion to minimize air/moisture exposure. $AlCl_3$ and TMSCl act as catalysts to deliver the targeted product. Next the catalyst solution was cooled between 0-10° C. using an external ethanol/dry ice bath. While rapidly stirring the heterogeneous catalyst solution with a mechanical agitator under a nitrogen blanket, 1000 grams of monomer feed rich in α-pinene (dried by 4 Å sieves) was added slowly. Upon completion of the monomer feed addition, the solution was stirred between 0-20° C. under nitrogen for 1.5 hours. Next, the ethanol/dry ice bath was removed and the solution warmed to room temperature (approximately 22° C.). Upon reaching room temperature, 500 grams of water were added to the RBF and stirring continued for 10 minutes at room temperature. The stirring was then stopped, the aqueous and organic layers were allowed to separate and the aqueous layer was. An additional water wash was performed. The organic layer was then transferred to another 5 L RBF where the solvent and light oils were removed by standard distillation practices. A yellow resin was produced having a softening point of 105.5° C. with a neat resin color of 4.4 Gardner. The resin yield was not measured for this reaction.

Example 4—Sample 4

Preparation of terpene-based resin having a 117° C. softening point. To a nitrogen-blanketed, 5 L Morton (baffled) round bottom flask (RBF) was added 800 grams of reagent grade xylene (dried by 4 Å sieves). To the xylene, 50 grams of aluminum chloride ($AlCl_3$) and 9.8 grams of trimethylchlorosilane (TMSCl) were added in a fashion to minimize air/moisture exposure. $AlCl_3$ and TMSCl act as catalysts to deliver the targeted product. Next the catalyst solution was cooled between 0-10° C. using an external ethanol/dry ice bath. While rapidly stirring the heterogeneous catalyst solution with a mechanical agitator under a nitrogen blanket, 1000 grams of monomer feed rich in α-pinene (dried by 4 Å sieves) was added slowly. Upon completion of the monomer feed addition, the solution was stirred between 0-20° C. under nitrogen for 1.5 hours. Next, the ethanol/dry ice bath was removed and the solution warmed to room temperature (approximately 22° C.). It was allowed to stir overnight under a nitrogen blanket. After stirring for approximately 18.5 hours under nitrogen, 500 grams of water were added to the RBF and stirring continued for 10 minutes at room temperature. The stirring was then stopped, the aqueous and organic layers were allowed to separate and the aqueous layer was removed via pipet. An additional water wash was performed. The organic layer was then transferred to another 5 L RBF where the solvent and light oils were removed by standard distillation practices. A yellow resin was produced having a softening point of 116.7° C. The resin yield was not measured for this reaction.

Example 5—Sample 5

Preparation of the terpene-based resin having a 129° C. softening point.

To a nitrogen-blanketed, 1 L Morton (baffled) round bottom flask (RBF) was added 135 grams of reagent grade xylene ("dried" by 4 Å sieves). To the xylene, 13.5 grams of aluminum chloride ($AlCl_3$) and 2.7 grams of trimethylchlorosilane (TMSCl) were added in a fashion to minimize air/moisture exposure. $AlCl_3$ and TMSCl act as catalysts and the exact amounts were based on α-pinene monomer to deliver the targeted product. Next the catalyst solution was cooled between 0-10° C. using an external ethanol/dry ice bath. While rapidly stirring the heterogeneous catalyst solution with a mechanical agitator under a nitrogen blanket, 270 grams of monomer feed rich in α-pinene "dried" by 4 Å sieves) was added slowly. Upon completion of the monomer feed addition, the solution was stirred between 0-10° C. under nitrogen for 5 hours. The solution warmed to room temperature (approximately 22° C.) and was allowed to stir overnight under a nitrogen blanket. After stirring for approximately 18.5 hours under nitrogen, 100 grams of water was added to the RBF and stirring continued for 10 minutes at room temperature. The stirring was then stopped, the aqueous and organic layers were allowed to separate and the aqueous layer was removed via pipet. An additional water wash was performed. The organic layer was then transferred to another 1 L RBF where the solvent and light oils were removed by standard distillation practices. A yellow resin was produced having a softening point of 129.4° C., with a color of 4.5 Gardner (889 Hazen, 44.2 Yellowness Index). The resin yield was 68.5%.

Methods used: DMA properties by a temperature-sweep in double shear mode from −60° C. to 100° C. with 1° C./min at 10 Hz and 0.1% (−60° C. till −5° C.) and 3% (−5° C. till 100° C.) dynamic strain using a Metravib +450N. Out of this measurement, the wet grip indicator commonly used is tan delta at 0° C. (tan δ 0° C.) and the rolling resistance indicator commonly used is tan delta at 60° C. (tan δ 60° C.).

The outcome of these experiments demonstrated that terpene-based resins of the type disclosed herein have significant lower $M_z$'s (range 1300-1600), compared to commercial limonene (range 1800-2250) and β-pinene based resins (3000-5000). See Table 1. Excellent wet traction properties were found (tan @ 0° C., 135-153%) with better rolling resistance (10-15% improvement compared to a standard commercial resin containing alpha methyl styrene (Comm. 6). Under the conditions tested, terpene-based resins of the type disclosed herein had the least negative impact on rolling resistance compared to other tread enhancement additives (Comm. 1-6) used as tread enhancement additives. The compositions of the present disclosure showed superior performance over Comm. 1-5 resins. The resins of the present disclosure provide increased wet traction properties while having the smallest negative impact on rolling resistance. Within the series, there is the possibility to select the preferred resin to obtain a balance between wet traction and rolling resistance.

TECs of the type disclosed herein displayed good wet traction properties (tan δ 0° C., 153%) and show approximately 10% better RR properties. Data showed that TECs comprising homopolymers of α-pinene show improved wet traction properties with improved rolling resistance. Due to its relative high softening point, Comm. 4 showed good wet traction properties, but shows worse rolling resistance. Comm. 5 showed wet traction properties in between Sample 2 (SP 100° C.) and Sample 5 (SP 130° C.) which could be expected based on its softening point. Limonene containing resins (Comm. 1-3) show worse RR than α-pinene resins (S1-5). The data are graphically illustrated in FIG. 1. Various properties of the resins are presented in Table 1.

TABLE 1

|  | SP (° C.) | Tg (° C.) | Mz | Mw | Mn | PDI |
|---|---|---|---|---|---|---|
| Sample 1 | 86 | 38 | 1430 | 865 | 547 | 1.58 |
| Sample 2 | 101 | 52 | 1532 | 960 | 575 | 1.67 |
| Sample 3 | 105 | 56 | 1170 | 831 | 607 | 1.37 |
| Sample 4 | 116 | 65 | 1332 | 917 | 657 | 1.40 |
| Sample 5 | 129 | 81 | 1538 | 1055 | 742 | 1.42 |
| Comm. 1 | 120 | 77 | 2055 | 1160 | 669 | 1.73 |
| Comm. 2 | 123 | 76 | 1976 | 1205 | 769 | 1.57 |
| Comm. 3 | 125 | 77 | 1895 | 1108 | 659 | 1.68 |
| Comm. 4 | 115 | 68 | 3803 | 1968 | 904 | 2.18 |
| Comm. 5 | 126 | 81 | 4628 | 2454 | 1131 | 2.17 |
| Comm. 6 | 85 | 39 | 1798 | 1207 | 687 | 1.76 |

Typical formulations of TECs of the type disclosed herein and methods of preparing same are presented in Table 2-5.

TABLE 2

Typical rubber compound formulation
FORMULATION

|  | Ref | Work |
|---|---|---|
| SSBR1 (BUNA 4526-2) | 48.12 | 48.12 |
| BR (Buna CB24) | 30 | 30 |
| SSBR (Sprintan SLR 4602) | 35 | 35 |
| Silica Ultrasil 7000 GR (SA165) | 80 | 80 |
| Carbon Black - N234 | 5 | 5 |
| Silane Si-69 | 8 | 8 |
| Zinc oxide RS | 3 | 3 |
| Stearic acid | 2 | 2 |
| Vulkanox 4010 (iPPD/antidegradant) | 1 | 1 |
| Vulkanox 4020 (6PPD/antidegradant) | 2 | 2 |
| Vulkanox HS (TMQ/antioxidant) | 0.5 | 0.5 |
| Antilux 654 (wax) | 1 | 1 |
| OIL (VivaTec 500) | 20 | 0 |
| Resins | 0 | 20 |
| Total | 235.62 | 235.62 |

TABLE 3

NP1

| Step # | Action | Time (min) | Speed (rpm) | Temp (° C.) |
|---|---|---|---|---|
| 1 | Add polymer | 0.5 | 60 | 75 |
| 2 | Masticate | 1 | 60 |  |
| 3 | Add 1$^{st}$ shot | 0.5 | 60 |  |
| 4 | Masticate | 1 | 60 |  |
| 5 | Add 2$^{nd}$ shot | 0.5 | 60 |  |
| 6 | Masticate | 1 | 60 |  |
| 7 | Add 3$^{rd}$ shot | 0.5 | 60 |  |
| 8 | Masticate | 0.5 | 60 |  |
| 9 | Ram raise | 0.1 | 60 |  |
| 10 | To temp |  | 100 | 150 |

TABLE 4

NP2

| Step # | Action | Time (min) | Speed (rpm) | Temp (° C.) |
|---|---|---|---|---|
| 1 | Add NP1 | 0.5 | 90 | 75 |
| 2 | To temp |  | 120 | 145 |
| 3 | Salinize | 4 | Variable | 145-150 |

TABLE 5

Final

| Step # | Action | Time (min) | Speed (rpm) | Temp (° C.) |
|---|---|---|---|---|
| 1 | Add remill | 0.5 | 55 | 75 |
| 2 | Masticate | 0.3 | 55 |  |
| 3 | Add curatives | 0.3 | 55 |  |
| 4 | To temp |  | 55 | 100 |

The terms "a," "an," and "the" are intended, unless specifically indicated otherwise, to include plural alternatives, e.g., at least one. Herein, while compositions and processes are described in terms of "comprising" various components or steps, the compositions and methods can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an aspect of the present disclosure whether or not the statement is explicitly recited.

While various aspects of the present disclosures have been shown and described, modifications thereof can be made by one skilled in the art without departing from the spirit and teachings of the disclosure. The aspects of the present disclosures described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure of the present disclosure. Thus, the claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

What is claimed is:

1. A tire tread composition comprising:
   (a) a rubber component selected from the group consisting of synthetic diene rubber and natural rubber;
   (b) at least one filler in the amount of from about 5 to 250 phr; and
   (c) a terpene-based resin comprising a terpene-based monomer selected from α-pinene, β-pinene, δ-3 carene, β-phellandrene and pyrolysates of α-pinene, β-pinene, δ-3 carene, δ-2 carene, turpentine, and combinations thereof;
   wherein the terpene-based resin has
   (i) a softening point of from about 80° C. to about 130° C.; (ii) a number average molecular weight ($M_n$) ranging from about 500 g/mol to about 775 g/mol; and (iii) a glass transition temperature ($T_g$) of from about 38° C. to about 81° C. ; and (iv) wherein the resin is substantially free of limonene.

2. The tire tread composition of claim 1, wherein the terpene-based resin is an α-pinene homopolymer.

3. The tire tread composition of claim 2, wherein the terpene-based resin comprises at least 99 wt. % of α-pinene based upon the total weight of the terpene-based resin.

4. The tire tread composition of claim 1, wherein the terpene-based resin is a mixture of α-pinene and β-pinene, and wherein α-pinene is present in an amount of at least 80 wt. % based upon the total weight of the terpene-base resin.

5. The tire tread composition of claim 1, wherein the terpene-based resin is a mixture of α-pinene and β-pinene present at a ratio ranging from 65:35 to 85:15.

6. The tire tread composition of claim 1, wherein the terpene-based resin has a z-average molecular weight ($M_z$) ranging from about 1300 g/mol to about 1600 g/mol.

7. The tire tread composition of claim 1, having a tan δ at 0° C. that is increased from about 135% to about 153% when compared to a composition without the resin.

8. The tire tread composition of claim 1, having a rolling resistance improvement of at least 4% when compared with a composition with an Alpha Methyl Styrene resin.

9. The tire tread composition of claim 1 having an improvement of the wet grip/rolling resistance ration (WG*RR) of at least about 7.5%, when compared with a composition with Alpha Methyl Styrene.

10. A tire tread composition of claim 1, wherein the terpene-based resin has a softening point of from about 60° C. to about 150° C., a weight average molecular weight of from about 800 g/mol to about 1100 g/mol, a z-average molecular weight of from about 1300 g/mol to about 1600 g/mol; and a glass transition temperature ($T_g$) of from about 38° C. to about 81° C.

11. The tire tread composition of claim 1, wherein the terpene-based resin is present in the range of from about 1 to about 50 phr.

12. The tire tread composition of claim 1, wherein component c) is an olefinically unsaturated non-acidic terpene compound.

* * * * *